No. 857,355. PATENTED JUNE 18, 1907.
S. W. MILLER.
PLURAL ALTERNATING SIPHON.
APPLICATION FILED NOV. 16, 1906.
2 SHEETS—SHEET 1.
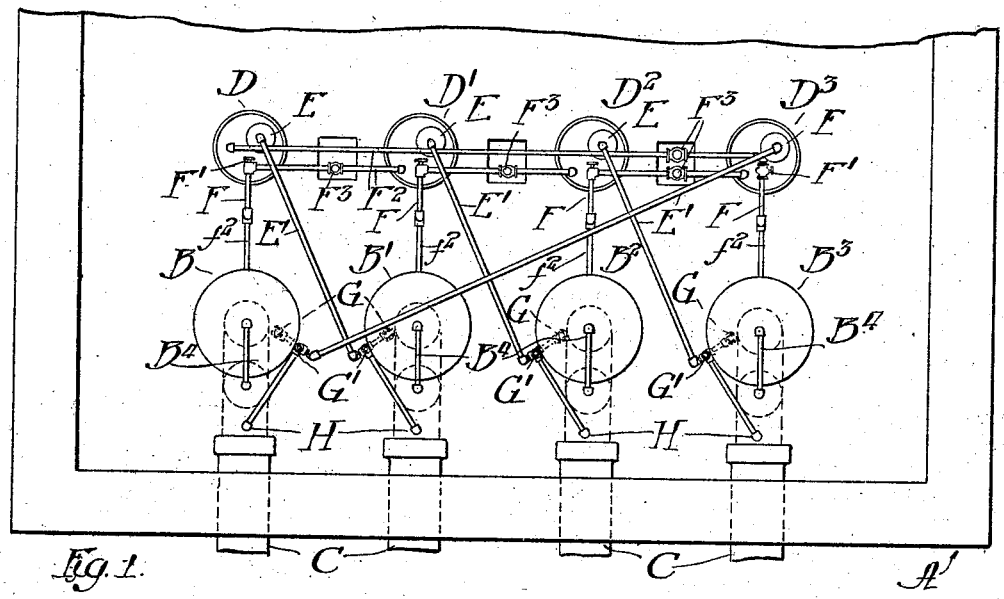
Fig. 1.
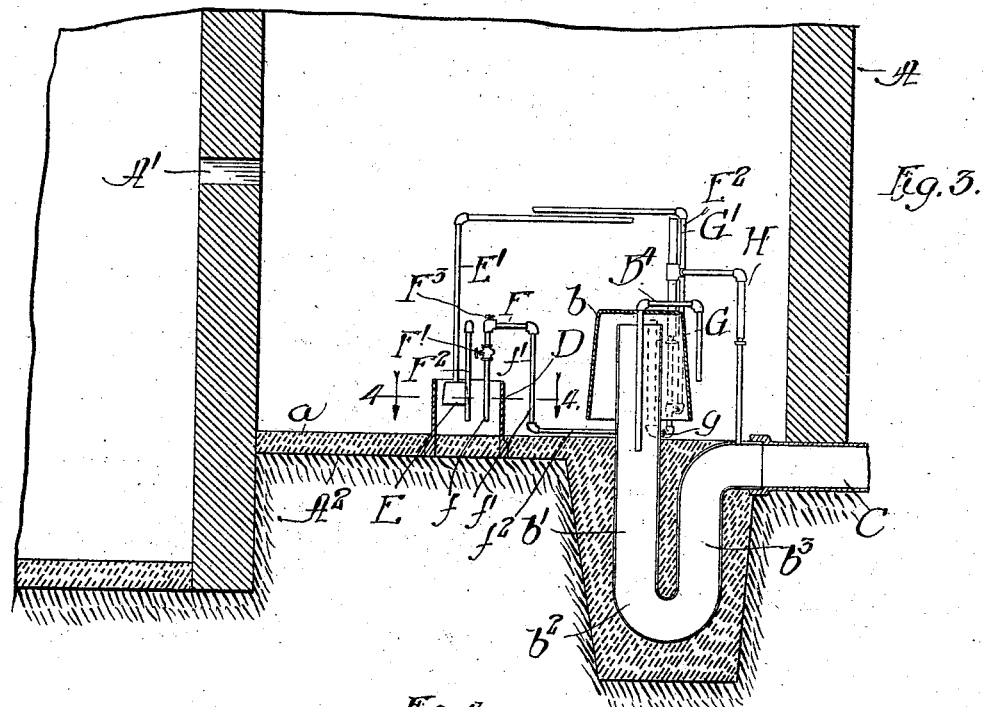
Fig. 3.
Fig. 4.
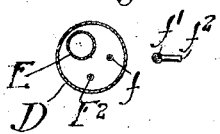
Witnesses:
Inventor
Sidney W. Miller
by Poole & Brown
his Attys.

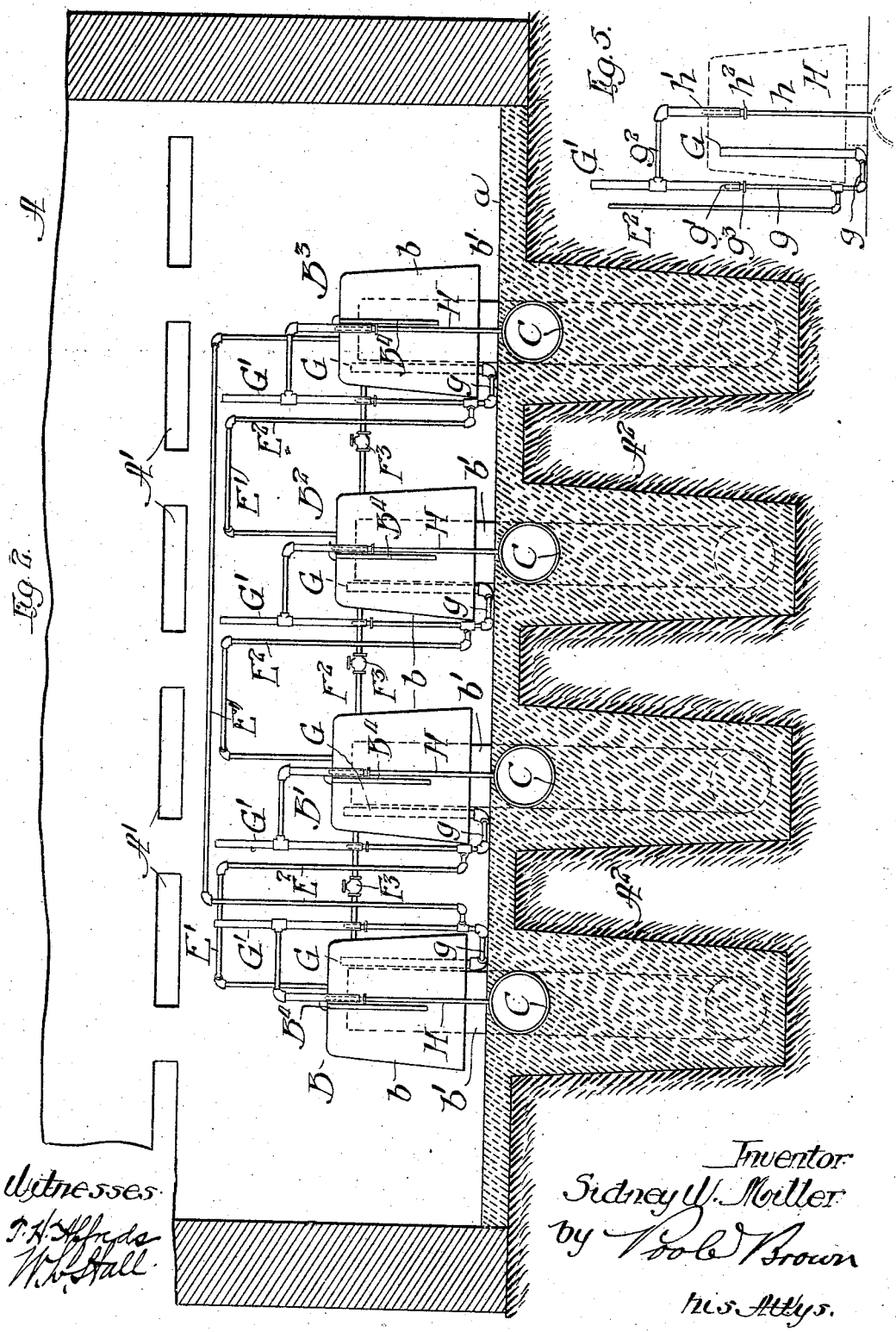

UNITED STATES PATENT OFFICE.

SIDNEY W. MILLER, OF CHICAGO, ILLINOIS.

PLURAL ALTERNATING SIPHON.

No. 857,355.         Specification of Letters Patent.         Patented June 18, 1907.

Application filed November 16, 1906. Serial No. 343,748.

*To all whom it may concern:*

Be it known that I, SIDNEY W. MILLER, a citizen of the United States, of Chicago, in the county of Cook and State of Illinois, have invented certain new and useful Improvements in Plural Alternating Siphons, (Case C;) and I do hereby declare that the following is a full, clear, and exact description thereof, reference being had to the accompanying drawings, and to the letters of reference marked thereon, which form a part of this specification.

This invention relates to improvements in siphonic apparatus designed for controlling the intermittent flow of liquid from a main or dosing tank to a plurality of tanks or receptacles, and so arranged that said plurality of receptacles may be filled or charged in a predetermined rotative order from said main or dosing tank.

My improved apparatus is applicable for use in connection with a system for the septic treatment of sewage for purifying the same, said apparatus in this use thereof being adapted to be located between a septic tank and the contact or filter beds of the system to receive the sewage as it flows from the septic tank and properly distribute the same to the contact or filter beds.

My invention relates more particularly to that type of such controlling apparatus as is shown in my prior United States Letters Patent No. 709,233, granted September 16th, 1902, wherein the siphons, which operate alternately in a predetermined order to empty the tank, are forced or set in operation, each in its proper order, by air pressure transmitted thereto during the filling of the tank.

Among the objects of the invention is to simplify the construction of such apparatus, to reduce its cost of maintenance and to improve the operation thereof.

As shown in the drawings:—Figure 1 is a plan view of a portion of the main distributing tank, showing in plan view the arrangement of the siphons and equipment therefor for discharging the contents of the tank. Fig. 2 is a vertical sectional view thereof taken in the plane of the siphons, with parts broken away. Fig. 3 is a vertical section taken in a plane at right angles to that of Fig. 2. Fig. 4 is a horizontal section, taken on line 4—4 of Fig. 3. Fig. 5 is a detail of one of the adjustable blow-off traps.

As shown in the drawings, A designates a tank which may be termed a main distributing or dosing tank and is adapted for communication with a source supplying a liquid through a plurality of conduits $A^1$. The floor of the tank is supported on or comprises the upper part of a body $A^2$ of cement in which the deep seal traps of the siphons are embedded. The liquid contents of said tank are emptied through the medium of a plurality of automatically operating siphons B $B^1$ $B^2$ and $B^3$, there being any number of siphons required for handling the product of the plant. The siphons are herein shown as located in a row near one wall of the tank, but may be otherwise disposed. The intake leg $b$ of each siphon consists of a downwardly opening bell which is supported over the upper end of the outlet leg $b^1$ thereof in any suitable manner. Said outlet leg of each siphon communicates with a deep seal trap $b^2$ having an upturned leg $b^3$ which empties into a pipe or conduit C leading to a suitable place for the disposal of the liquid discharged from the tank. Each siphon is equipped with the usual vent pipe $B^4$ which operates in a well known manner to vent the siphon after it has operated to empty the tank. Located in said tank in rear of the siphons is a series of upwardly opening chambers or wells D $D^1$ $D^2$ $D^3$, one for each siphon, and said chambers are operatively associated with the siphons in the manner hereinafter to be described. Said chambers are located in the tank and are filled by the liquid which fills the tank. As herein shown, the floor of the tank constitutes the floors of said chambers, but this relation of the parts will depend upon the sealing level of the siphons in the tank. Contained within each chamber or well D to $D^3$, inclusive, is a downwardly opening bell-shaped receptacle E, supported therein in any suitable manner, not necessary here to be shown. Said bells are made of less diameter than the chambers and are connected with the blow-off traps of the siphons by pipes $E^1$, whereby, when liquid enters said chambers and rises above the bottoms of the bells, pressure due to the liquid head above said bells is transmitted through said pipes $E^1$ to the blow-off traps of the siphons in a manner to force said traps and set the siphons in operation, as will be hereinafter more fully explained.

Each siphon communicates with its associated chamber D to $D^3$ through the medium of a siphon F, the intake leg $f$ of which extends downwardly into the associated chamber through the open top thereof, and the outlet leg $f^1$ of which communicates by a pipe $f^2$ with the outlet leg of the siphon; or other suitable space for disposal of liquid flowing through the siphon F. The function of said siphon F is to empty each chamber through its associated siphon at the time the siphon is in operation to empty the tank A, as will more fully hereinafter appear. Each of said siphons B to $B^3$, inclusive, is equipped with a blow-off trap comprising an upwardly opening, vertical leg G extending upwardly into the bell or intake leg of the siphon, an outer vertical leg $G^1$ outside the bell, connected with the said leg G by a transverse connection $g$ and open at its upper end to the atmosphere, as herein shown. Each blow-off trap is drained, at times when liquid overflows the outer leg thereof, through the medium of a drain pipe H that discharges outside the tank, as into the outlet leg of the deep seal trap of the associated siphon. The pressure transmitting pipes of the starting bells are connected with the outer legs $G^1$ of said blow-off traps near the lower ends of the traps; said pressure transmitting pipes extending upwardly from the starting bells and thence horizontally and terminating in downturned portions $E^2$ which communicate with the blow-off traps in the manner stated. The two vertical legs of each blow-off trap, taken in connection with the down-turned end $E^2$ of the associated pressure transmitted pipe, which latter pipe is generally parallel with the legs of the blow-off trap, constitute what may be termed a W-trap, the function of which will hereinafter appear.

The starting bell E of each chamber D to $D^3$, inclusive, is connected by its pipe $E^1$ with the blow-off trap of a main siphon next in advance (considered with respect to the rotative order of operation of the siphons) of the main siphon into which the contents of the chamber associated with such bell is emptied through one of the siphons F. Thus the starting bell of the chamber D communicating with the blow-off trap of siphon $B^1$; the bell of chamber $D^1$ communicating with the blow-off trap of siphon $B^2$ and so on to the end of the series. In an arrangement where the siphons are disposed in a row, as herein shown, the bell of the last chamber of the series $D^3$ is connected with the blow-off trap of the first siphon B of the series (Fig. 1). This arrangement, while a preferable one, when the siphons are disposed in a straight line, may be varied. That is to say, the main siphon associated with each chamber, and through which siphon said chamber is emptied, need not necessarily be the siphon next adjacent to said chamber, it only being necessary that each main siphon be associated with one chamber of the series in a manner to empty said chamber, and that the starting bell of such chamber shall communicate with the blow-off trap of the siphon next to be brought into operation.

The operation of the apparatus thus disclosed may be briefly stated as follows: The deep seal traps, as well as the blow-off traps, are filled with liquid prior to the filling of the tank A, and all but one of the chambers D are likewise filled. If it be assumed that chambers D $D^1$ and $D^2$ be filled with liquid and chamber $D^3$ be empty, the operation of the apparatus will be as follows: Liquid flows into the tank through the inlet openings $A^1$, and after the tank has been filled to the level of the tops of the chambers D to $D^3$ the liquid overflows into and fills the empty chamber $D^3$. During the filling of said chamber $D^3$ and the continued rise of liquid in the tank, the liquid rises around and into the lower end of the bell therein, thus displacing the air and causing air pressure to be transmitted through its pipe $E^1$ to the blow-off trap of siphon B, in this instance, or the siphon next to be brought into operation. It may be observed in passing that, in the construction herein shown, the upper ends of the chambers are located at or below the sealing and venting levels of the siphons, thereby insuring that the intake legs of the siphons F are submerged by the liquid in the chambers, and, therefore, sealed, at or before the time the outer legs of the vent pipes $B^4$ are sealed. Thus passage of air from the siphons through said siphons F is cut-off. In constructions where the sealing level of the siphon is below the tops of the chambers, it is necessary to provide means for sealing the limbs of the chamber emptying siphons, which may be accomplished in the manner shown in my said prior United States Letters Patent No. 709,233. By reason of the fact that all the chambers, save chamber $D^3$, and the starting bells therein, are already filled with liquid, little effective pressure is transmitted through the pipes $E^1$ associated with the filled chambers, as the liquid rises above said chambers. During the filling of the empty chamber, however, the air in its bell is imprisoned so that the liquid head exerted on the air in the last mentioned bell and its pressure transmitting pipe is superior to that exerted on the air in the other transmitting pipes and in the main siphons. Therefore, the main siphon associated with the bell within the chamber last filled is brought into action. During the time the siphon B is operating to empty the tank, the chamber D associated therewith is emptied through the connecting siphon F to a level below the sealing level of the starting bell E therein. After the tank is thus emptied, the chambers $D^1$ $D^2$ and $D^3$ remain filled while the chamber D is empty. During the next filling of the tank the flow of liquid into said chamber D operates through the starting bell E and pipe $E^1$, connected with the blow-off trap of siphon $B^1$, to bring the latter in operation to empty the tank. This rotative order of bringing the siphons into operation is continued throughout the series of siphons so long as the operation of the apparatus continues.

With respect to the action of the blow-off traps and their operation in connection with the bells E and pressure transmitting pipes $E^1$, $E^2$, it will be noted that the air spaces in said pipes $E^1$ and bells are of considerably less area than that of the main siphons, whereby the liquid rises more slowly in the said bells when the tank is filling, after the bells have been sealed, than in the shorter legs of the main siphons. Thus the liquid heads acting on the columns of air in the bells and pressure transmitting pipes becomes progressively greater than the heads acting on the bodies of imprisoned air in the main siphons. It will be observed, furthermore, that the intake legs G of the blow-off traps are larger than the outlet legs thereof, so that a given depression of the liquid columns in said intake legs results in a correspondingly greater rise of the liquid in the outlet legs of said blow-off traps. Notwithstanding the different pressures acting on the liquid columns in said pipes G and $E^2$, therefore the tendency of such pressures is to depress the liquid in said pipes and correspondingly raise the liquid in the outlet legs $G^1$ of the blow-off traps. The rise of the liquid in the latter legs of the blow-off traps continues until it reaches the levels of the drain-pipes H which limits the height of the columns in said outlet legs of the blow-off traps. The seals of the blow-off traps are, therefore, fixed by the distance between the transverse connecting pipes $g$ of the blow-off traps and the receiving ends of the drain-pipes H. Thereafter, as the liquid is further depressed in the pipes G and $E^2$, it overflows into the drain-pipes H until the liquid has been depressed in the pipes $E^2$ to the levels of the connections thereof with the outlet legs of the blow-off traps. At this time air escapes from the pipes $E^2$ upwardly through the outlet legs of the blow-off traps, carrying with it some of the liquid theretofore contained in said outlet legs. The pressure in the outlet legs of the blow-off traps is thus lowered below the pressure in the main siphons, whereupon the superior pressure of the main siphons forces the blow-off traps, carrying with it some of the liquid from the blow-off traps and starting the main siphons in operation. During the emptying of the tank through the main siphons thus forced, the blow-off traps and the connected pipes $E^2$ are filled with a sufficient quantity of liquid to afford the proper seal therefor in the subsequent operation of one of the siphons, all of the parallel vertical pipes being filled to the same level. It will be noted that the intake legs G of the blow-off traps are made of such capacity as to constitute, in effect, a reservoir which insures the diversion of sufficient liquid thereto during the emptying operation of the main siphons to fill all of said pipes to the proper sealing levels. The outlet legs $G^1$ of the blow-off traps extend above its connection with the drain pipes H and above the maximum liquid level of the tank to furnish free avenues of escape for the air forced through the blow-off traps, although in some instances the released air may escape through the drain pipes H.

It is desirable in some instances to temporarily cut one of the tank emptying siphons out of the operating series. This may be made desirable when, for instance, the apparatus is used in connection with a sewage purifying plant in order that one of the contact or filter beds upon which one of the siphons discharges may be put out of action for the purpose of resting or repairing the same. This result may be accomplished by the following construction. The inlet leg of each of the chamber-emptying siphons F is provided with a normally open cut-off valve $F^1$; and each of said inlet legs of the siphons F is in communication with a horizontal pipe $F^2$ that extends to the next adjacent chamber, relative to the order of operation of the siphons associated with said chambers. Said pipes are provided with down-turned ends that extend downwardly into said chambers. The pipes $F^2$ constitute, when in service, extensions of the chamber emptying siphons. They are provided with cut-off valves $F^3$ which are normally closed. The pipe $F^2$ that connects the siphon F associated with siphon $B^3$ and chamber $D^3$ extends continuously from one end of the series of chambers to the other. In order to cut out one of the tank emptying siphons from the operating series, the valve $F^1$ of the chamber emptying siphon belonging to the siphon next to be brought into operation, and first in rear of the siphon to be cut out, is closed and the normally closed valve $F^3$ of the horizontal extension $F^2$ of the latter chamber emptying siphon is opened. In the subsequent operation of one of the tank emptying siphons, the liquid from the chamber normally associated with the siphon to be cut out of service is emptied through the tank emptying siphon in operation, and no liquid is drawn from the chamber normally associated with said operating tank emptying siphon. When the tank is again filled, therefore, and the chamber just emptied is refilled, the liquid acts on the starting bell E of said chamber and its pipe $E^1$ to transmit pressure to the tank emptying siphon second in advance of the last operated tank emptying siphon to bring it into operation, thus cutting out the intermediate tank emptying siphon from operation.

It will be observed that not only the chamber emptying siphons, but also the pressure transmitting pipes $E^1$ are located wholly above the floor of the tank so that it becomes possible to repair said siphons and pipes without the necessity of disturbing the siphon settings or the concrete foundations in which they are embedded. This arrangement contributes, not only to the facility of repairing said parts, but also to the ease in which they may be originally installed in the apparatus. This feature of the construction becomes of considerable importance by reason of the fact that it is usual in the installation of apparatus of this character that one set of workmen sets the siphons and another set equips the apparatus with the auxiliary equipment that gives it the functions hereinbefore described. Such arrangement makes it unnecessary that the siphons be set with such accuracy as where the pipe connections are relatively rigid, inasmuch as there is sufficient flexibility of the pipe connections to compensate for a relatively wide range of inaccuracy of setting of the main siphons.

The blow-off traps associated with the tank emptying siphons may be made adjustable in the general manner shown in my co-pending application for United States Letters Patent Serial Number 337,961, filed October 8th, 1906, and they are herein shown as so constructed. As herein shown, referring more particularly to Fig. 5, the outlet leg of the blow-off trap comprises a lower fixed member $g$ and an upper extension member $g^1$ which has sliding or telescopic connection with the fixed member, it being immaterial which member fits within the other. So also the drain pipe H comprises a fixed lower member $h$ and an upper elongation $h^1$ that has sliding or telescopic connection with said lower stationary part. The said sliding extension members $g^1$ and $h^1$ are connected by a transverse connecting pipe $g^2$ which moves with said adjustable members. Joints $g^3$ $h^2$ of any suitable nature such, for instance, as described in my aforesaid application, are employed to produce water-tight connections between the sliding and stationary parts.

I claim as my invention:—

1. An apparatus for the purpose set forth comprising a tank, a plurality of trapped siphons operating alternately to empty said tank, blow-off traps communicating with the air spaces of said siphons above their traps, and means controlled by the rise of liquid in said tank, operating in a predetermined order to transmit pressure to said blow-off traps to start said siphons into operation.

2. An apparatus for the purpose set forth comprising a liquid tank, a plurality of trapped siphons operating alternately to empty said tank, blow-off traps located above the floor of the tank and communicating severally with the said siphons above their traps, and means controlled by the rise of liquid in the tank operating alternately to force said blow-off traps and start said siphons into operation.

3. An apparatus for the purpose set forth comprising a liquid tank, a plurality of trapped siphons operating alternately to empty said tank, chambers associated with said siphons, blow-off traps severally communicating with the siphons above their traps, and means controlled by the presence of liquid in said chambers acting to transmit pressure alternately to said blow-off traps to force the same and start the siphons into operation.

4. An apparatus for the purpose set forth comprising a liquid tank, a plurality of trapped siphons for emptying said tank, chambers associated with said siphons, blow-off traps severally communicating with the siphons above their traps, means controlled by the presence of liquid in said chambers acting to transmit pressure alternately to said blow-off traps to force the same and start the siphons into operation, and means operating during the operation of each siphon for emptying its associated chamber.

5. An apparatus for the purpose set forth comprising a liquid tank, a plurality of trapped siphons operating alternately to empty the tank, a blow-off trap for each siphon comprising two legs, one of which communicates with the air space in the siphon and the other of which discharges into the atmosphere, and a pressure transmitting pipe communicating with the latter leg of the blow-off trap.

6. An apparatus for the purpose set forth comprising a liquid tank, a plurality of trapped siphons operating alternately to empty the tank, a blow-off trap for each siphon comprising a leg which extends upwardly into the intake leg of the siphon, and a vertical outer leg connected with said inner leg and discharging to the atmosphere, and a pressure transmitting pipe connected with said trap on the side of the outer leg remote from the inner leg.

7. An apparatus for the purpose set forth comprising a liquid tank, a plurality of trapped siphons operating alternately to empty said tank, a blow-off trap associated with each siphon comprising an inner leg which extends upwardly into the intake leg of the siphon, and a vertical leg extending upwardly outside of said intake leg of said siphon and connected with the first mentioned leg by a transverse portion and a pressure transmitting pipe connected with the outer leg near the lower end thereof, and disposed parallel with said legs of the trap.

8. An apparatus for the purpose set forth comprising a liquid tank, a plurality of trapped siphons acting alternately to empty the tank, a series of chambers severally associated with said siphons and filled from the source supplying liquid to the tank, a downwardly opening bell in each chamber, a pressure transmitting pipe located above the floor of the tank and connected at one end with said downwardly opening bell, and at its other end with one of the siphons, and means for discharging each chamber through the medium of its associated siphon.

9. An apparatus for the purpose set forth, comprising a tank, a plurality of siphons operating alternately to empty the tank, means operating during the filling of the tank to transmit pressure to one siphon of the series at a time to bring the same into operation, and means for separately cutting each siphon out of the operative series.

10. An apparatus for the purpose set forth comprising a plurality of tanks, a plurality of trapped siphons operating alternately to empty the tank, a series of chambers severally associated with said siphons and filled from the source supplying liquid to the tank, means operating during the filling of each chamber for transmitting pressure to the siphon associated with another chamber of the series to start said siphon into operation, means for emptying each chamber through the operation of its associated siphon, and means for separately cutting out each siphon from the operating series.

11. An apparatus for the purpose set forth comprising a tank or receptacle, a plurality of trapped siphons operating alternately to empty the tank, a series of chambers severally associated with said siphons and filled from the source supplying liquid to the tank, means operating during the filling of each chamber for transmitting pressure to the siphon associated with another chamber of the series to start said siphon into operation, a chamber emptying siphon connecting each chamber with its associated siphon for emptying the contents of each chamber through the operation of its said associated siphon, each chamber emptying siphon being provided with an extension pipe dipping into another chamber of the series, and valves in said chamber emptying siphons and the extension pipes thereof.

12. An apparatus for the purpose set forth, comprising a tank, a plurality of trapped siphons, blow-off traps associated with said siphons, means for operating said siphons in a predetermined rotative order for emptying the tank, and means for varying the depth of seal of said blow-off traps.

13. An apparatus for the purpose set forth comprising a tank, a plurality of trapped siphons, blow-off traps associated with said siphons, each provided with a longitudinally adjustable outlet end, and pressure means operating with said blow-off traps to bring the siphons into operation, constructed to operate said siphons in a predetermined rotative order.

14. An apparatus for the purpose set forth comprising a tank, trapped siphons operating alternately to empty the tank, blow-off traps associated with said siphons, means controlled by the rise of liquid in said tank, operating in a predetermined order to transmit pressure to said blow-off traps to start the siphons into operation, and means for varying the depth of seal of said blow-off traps.

In testimony, that I claim the foregoing as my invention I affix my signature in the presence of two witnesses, this 9th day of November A. D. 1906.

SIDNEY W. MILLER.

Witnesses:
W. L. HALL,
GEORGE R. WILKINS.